US012585526B2

(12) United States Patent
Gao et al.

(10) Patent No.: US 12,585,526 B2
(45) Date of Patent: Mar. 24, 2026

(54) MEDICAL IMAGING DEVICE FAULT HANDLING

(71) Applicant: KONINKLIJKE PHILIPS N.V., Eindhoven (NL)

(72) Inventors: Qi Gao, Eindhoven (NL); Meru Adagouda Patil, Bangalore (IN); Soubhik Paul, Bangalore (IN); Nagaraju Bussa, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 36 days.

(21) Appl. No.: 18/708,620

(22) PCT Filed: Nov. 17, 2022

(86) PCT No.: PCT/EP2022/082168
§ 371 (c)(1),
(2) Date: May 9, 2024

(87) PCT Pub. No.: WO2023/088983
PCT Pub. Date: May 25, 2023

(65) Prior Publication Data
US 2025/0013519 A1    Jan. 9, 2025

(30) Foreign Application Priority Data

Nov. 19, 2021    (EP) ..................................... 21209234

(51) Int. Cl.
*G06F 11/07*            (2006.01)
(52) U.S. Cl.
CPC ...... *G06F 11/0781* (2013.01); *G06F 11/0778* (2013.01)

(58) Field of Classification Search
CPC ............. G06F 11/0781; G06F 11/0778; G06F 11/0766; G06F 11/0769
USPC ..................................................... 714/48, 26
See application file for complete search history.

(56) References Cited

U.S. PATENT DOCUMENTS

| | | | | |
|---|---|---|---|---|
| 6,882,271 | B2* | 4/2005 | Hendrickson | G06F 11/2247 340/286.07 |
| 11,157,373 | B2* | 10/2021 | Alcorn | G06F 11/1464 |
| 2017/0302540 | A1* | 10/2017 | Monahan | H04L 41/5051 |
| 2019/0007282 | A1* | 1/2019 | Hsieh | H04L 69/40 |
| 2020/0089983 | A1 | 3/2020 | Manickam | |

(Continued)

FOREIGN PATENT DOCUMENTS

| | | |
|---|---|---|
| EP | 3336636 B1 | 12/2020 |
| IN | 201821035006 A | 3/2020 |

OTHER PUBLICATIONS

International Search Report and Written Opinion Dated Feb. 15, 2023 For International Application No. PCT/EP2022/082168 Filed Nov. 17, 2022.

(Continued)

*Primary Examiner* — Chae M Ko

(57)            ABSTRACT

Proposed are concepts pertaining to aiding fault diagnosis through the consideration of the relevance of different log files to a fault. In particular, embodiments of the invention propose generating predicted relevance scores for different log files, and/or content contained therein. The most relevant log file(s), or parts thereof, may then be prioritized for provision to an engineer, for example.

14 Claims, 10 Drawing Sheets

Obtaining initial problem input data relating to the fault —110

Performing first natural language processing analysis on the initial problem input data —120

Providing feature(s) of the medical imaging device fault to a machine learning algorithm —130

Obtain prediction result from the machine learning algorithm —140

Determine relevance score for content of each log file —150

100

(56)         References Cited

U.S. PATENT DOCUMENTS

2021/0133054 A1    5/2021    Alcorn

OTHER PUBLICATIONS

Kahles, et al: "Automating Root Cause Analysis via Machine Learning in Agile Software Testing Environments", Proceedings— 2019 IEEE 12th International Conference on Software Testing, Verification and Validation, ICST 2019.
Du, et al: "DeepLog: Anomaly Detection and Diagnosis from System Logs through Deep Learning", in Proceedings of the 24 th ACM SIGSAC Conference on Computer and Communications Security (CCS 17). Dallas, TX, USA: ACM, Nov. 2017, pp. 1285-1298.

* cited by examiner

| Determining the relevance of a plurality of log files to a fault of a medical imaging device | ~100 |

| Generate a prioritized list of the log files | ~210 |

200

500

| Criticality Tag | Description | Weight |
|---|---|---|
| VC | Very Critical | W1 |
| MC | Medium Critical | W2 |
| LC | Less Critical | W3 |

MEDICAL IMAGING DEVICE FAULT HANDLING

CROSS REFERENCE TO RELATED APPLICATIONS

This application is the U.S. National Phase application under 35 U.S.C. § 371 of International Application No. PCT/EP2022/082168 filed Nov. 17, 2022, which claims the benefit of European Patent Application Number 21209234.0 filed Nov. 19, 2021. These applications are hereby incorporated by reference herein.

FIELD OF THE INVENTION

The present invention relates to the field of equipment maintenance, and in particular to the field of handling faults of a medical imaging device.

BACKGROUND OF THE INVENTION

A medical imaging device may occasionally malfunction, i.e., exhibit a fault and fail to work properly.

Typically, in response to a fault in a medical imaging device, one or multiple service engineers are assigned to diagnose and resolve the fault. Such service engineers may perform the diagnosis remotely, or on site.

During fault diagnosis, the service engineer(s) may need to inspect the log files of the medical imaging device to identify relevant diagnostic information such as error messages. The log files of a medical imaging device may contain critical information which helps service engineers identify the root cause of the fault.

Log files may be retrieved on-demand so that they contain the most recent information about the device. However, due to data size and number of concurrent requests, it can take a significant amount of time to download/retrieve the log files. The resultant time delay impacts troubleshooting and causes additional system downtime.

There is therefore a desire to reduce the length of time taken to identify the cause or solution to a fault in a medical imaging device.

A document US 2020/0089983 A1 discloses methods and systems for addressing malfunction of a medical imaging device. The method includes classifying a type of an image artifact in a medical image acquired by the medical imaging device by using a trained machine learning model. The method also includes analyzing system data associated with acquisition of the medical image to identify one or more system parameters that might have contributed to the type of image artifact and providing an action for addressing the image artifact based on the identified one or more system parameters.

A document US 2021/133054 A1 discloses an apparatus and computer program product including program instructions configured to cause a processor to perform operations. The operations may include detecting a system failure in a host node, wherein the host node locally stores log files during operation of the host node. The operations may further include receiving a request for failure event log data stored by the host node, and identifying an amount of available storage capacity of a designated remote data storage device, prioritizing data from the log files to be included in the failure event log data, and selecting a subset of the failure event log data in order of descending priority until the total amount of the selected data would substantially fill the remote data storage device. Still further, the operations may include transferring, in response to receiving the request, the selected subset of the data to the designated remote data storage device.

SUMMARY OF THE INVENTION

The invention is defined by the claims.

According to examples in accordance with an aspect of the invention, there is provided a method for diagnosing a fault of a medical imaging device. The method comprises determining a relevance of log files to the fault of the medical imaging device, the medical imaging device comprising a plurality of subsystems, and each log file being associated with a respective subsystem of the medical imaging device. The operation of determining a relevance of log files to the fault of the medical imaging device comprises:

obtaining initial problem input data relating to the fault of the medical imaging device; performing a first natural language processing analysis on the initial problem input data to identify one or more features of the medical imaging device fault;

providing one or more features of the medical imaging device fault to a machine learning algorithm, the machine learning algorithm being trained to predict, for each of the plurality of subsystems of the medical imaging device, a fault probability indicating a likelihood that the fault of the medical imaging device originated from the subsystem;

obtaining a prediction result from the machine learning algorithm, the prediction result comprising a fault probability for each of the plurality of subsystems of the medical imaging device; and determining, for content of each log file, a relevance score based on the obtained prediction result. The method for diagnosing the fault of the medical imaging device further comprises:

generating a prioritized list of the log files based on the determined relevance of the content of the plurality of log files.

Proposed concepts thus aim to provide schemes, solutions, concepts, designs, methods and systems pertaining to aiding fault diagnosis through the consideration of the relevance of different log files to a fault.

In particular, embodiments of the invention propose generating predicted relevance scores for different log files, and/or content contained therein. The most relevant log file(s), or parts thereof, may then be prioritized for provision to an engineer, for example.

A proposed concept recognizes that different log files may be of different relevance to a particular fault, and that such relevance may be identified in order to assist in the selection and/or provision of log files for fault diagnosis. It is also proposed that the relevance of a log file content may be learnt (e.g. from historical data) and thus predicted using machine-learning.

Embodiments may therefore provide the advantage that irrelevant log file content can be identified and prevented from provision to an engineer, thereby avoid unnecessary data retrieval/downloading. For example, embodiments may enable the most relevant log file content to be identified and provided to an engineer as a priority.

In other words, embodiments propose to generate predicted relevance scores for different log files and/or different log file content. The relevance scores may aid the prioritisation of log file content for fault analysis and/or diagnosis. Accordingly, embodiments may be used in relation to fault diagnosis so as support a service engineer when diagnosing and resolving the fault. Improved (e.g. quicker) fault reso-
lution in medical imaging devices may therefore be provided
by proposed concepts.

In some embodiments, the method for diagnosing the
fault of the medical imaging device further comprises:

transmitting the log files in the prioritized list over a data
communication channel to a remote processing device,
and in a priority order defined by the prioritized list, the
remote processing device being configured for analy-
sing the transmitted log files and for diagnosing the
fault of the medical imaging device based on a result of
the analysing.

In these embodiments, the transmission of the log files
over the data communication channel facilitates the analysis,
and also the diagnosis, of the fault of the medical imaging
device at the remote processing device. This obviates the
need for a service engineer to be present at the location of
the medical imaging device in order to perform a diagnosis
of its fault. The transmission of a prioritised list of the log
files also reduces the amount of data that needs to be
transmitted over the data communication channel. As com-
pared to a practice of transmitting all log files to a remote
location for analysis, this reduces the bandwidth demand
that is associated with transmitting large files of log data
over the communication channel. Moreover, by transmitting
the log files in a priority order defined by the prioritized list,
it is ensured that the most relevant log files arrive first at the
remote processing device. The log files may then be ana-
lysed in the order of their priority. This also reduces the
bandwidth demand associated with transmitting large files of
log data over the communication channel and/or reduces the
delay incurred in diagnosing the fault because the fault may
already be diagnosed at the remote processing device after
analysing only the most relevant log file(s), i.e. without the
need to wait for all potentially relevant log files on the
prioritised list to be transmitted. Consequently, the fault of
the medical imaging device may be diagnosed in a more
time-efficient manner.

In some embodiments, obtaining initial problem input
data may comprise receiving, via in input interface, initial
problem input data provided by a respondent in response to
a request for data.

The request for data may, for example, comprise a fault
analysis questionnaire. In this way, responses of the respon-
dent to the questionnaire may be provided as initial problem
input data. Such responses may thus be used to identify one
or more features of the fault. Embodiments may therefore
cater for natural language description of a medical imaging
device fault, thereby facilitating simple and intuitive data
provision.

The machine learning algorithm may be trained using a
training algorithm configured to receive an array of training
inputs and respective known outputs, wherein a training
input comprises one or more features of a fault of a medical
imaging device and respective known output comprises, for
each of the plurality of subsystems of the medical imaging
device, a fault probability indicating a likelihood that the
fault of medical imaging device originated from the subsys-
tem. In this way, the machine learning algorithm may be
trained to output a fault probability prediction for each log
file when provided with one or more features of a fault of a
medical imaging device In some embodiments, the machine learning algorithm
may comprise a binary classifier trained to make a decision
about the fault of the medical imaging device originating in
a software subsystem or a hardware subsystem. Dividing (at least part of) the classification into a binary decision may
simplify probability analysis as well as reducing noise in
classification.

In some embodiments, the step of determining, for con-
tent of each log file, a relevance score may comprise:
determining, for content of each log file, system relevance
scores indicating a relevance of the log file to each of the
subsystems; determining, for each subsystem, an error prob-
ability indicating a probability that the fault of the medical
imaging device relates to the subsystem; and processing the
system relevance scores and error probabilities to obtain, for
content of each log file, a relevance score.

Embodiments may propose a technique to find not only
relevance log file but also problem specific log content (i.e.
the relevant sections inside a log file/part of log file). Such
identification of log content that specifically relevant to a
fault/problem may be particularly advantageous.

By way of example, processing may comprise: processing
the system relevance scores and error probabilities based on
the following equation:

$$R(e, m, f) = R_{comp}(f) P_{comp}(e, m) + \sum\nolimits_{i=1}^{n} R_{sub_i}(f) P_{sub_i}(e, m)$$

wherein: $R(e,m,f)$ is the relevance score of a log file f for
the medical imaging device m with the fault e; $R_{comp}(f)$
indicates how relevant the log file f is for a component
related fault; $R_{sub_i}(f)$ indicates how relevant the log file f is
for a fault in a subsystem; $P_{comp}(e,m)$ is the probability of
the fault e being component-related; and $P_{sub_i}(e,m)$ is the
probability of the fault e being related to a subsytem.

According to another aspect of the invention, there is
provided a method for determining severity of a fault of a
medical imaging device comprising a plurality of subsys-
tems, the method comprising:

obtaining initial input data from a user relating to the fault
of the medical imaging device;

performing a first natural language processing analysis on
the initial input data to determine a first severity score
relating to a description of the fault;

analyzing the initial input data and the plurality of sub-
systems to determine a second severity score relating to
the subsystems of the medical imaging device; and determining an overall severity score indicating a severity
of the fault based on the first severity score and the
second severity score.

A concept for determining severity of a fault of a medical
imaging device may therefore be proposed, and this may
then be used to prioritize the provision of log files to an
engineer for example. Some embodiments may further com-
prise determining a third severity score relating to a priority
of a user of the medical imaging device. The step of
determining an overall severity score may then be further
based on the third severity score. In this way, embodiments
may account for different users, thus facilitating dynamic
adaptation of results according to a user's credential for
example.

Embodiments may also comprise applying a weighting to
the overall severity score based on at least one of: the first
severity score; the second severity score; and a parameter
value of a log file identified for the fault. Such embodiments
may cater for situations where multiple reported issues get
a similar severity score. For instance, calculation of a final
weighted score may account for factors (e.g. log file size)
that may influence a preference for log file provision. The
severity of a fault may be given a high weighting value according to some factors (e.g size of a log file, where a smaller log file may be given a higher weighting value), whereas other factors may result in a lower weighting value being applied (e.g size of a log file, where a bigger log file may be given a lower weighting value.

According to yet another aspect of the invention, there is provided a method for diagnosing a fault of a medical imaging device, the method comprising:

determining a severity of the fault of a medical imaging device according to a proposed embodiment;

for a plurality of log files associated with respective subsystems of the medical imaging device, generating a prioritized list of the log files based on the determined severity of the fault. According to another aspect, there is provided a method for diagnosing a fault of a medical imaging device, the method comprising:

determining the relevance of log files to a fault of a medical imaging device according to a proposed embodiment;

determining a severity of the fault of the medical imaging device according to a proposed embodiment; and generating a prioritized list of the log files based on the determined relevance of the plurality of log files and the determined severity of the fault of the medical imaging device.

The step of generating a prioritized list of the log files may also be further based on a parameter value of each log file, such as log file size for example.

According to another aspect, there is provided a computer program product, wherein the computer program product comprises a computer-readable storage medium having computer-readable program code embodied therewith, the computer-readable program code configured to perform all of the steps of a proposed embodiment.

Thus, there may also be provided a computer system comprising: a computer program product according to proposed embodiment; and one or more processors adapted to perform a method according to a proposed concept by execution of the computer-readable program code of said computer program product.

According to still another aspect of the invention, there is provided a system for determining a relevance of log files to a fault of a medical imaging device, the medical imaging device comprising a plurality of subsystems, and each log file being associated with a respective subsystem of the medical imaging device, the system comprising:

a data interface configured to obtain initial problem input data relating to the fault of the medical imaging device;

a natural language processing component configured to perform a first natural language processing analysis on the initial problem input data to identify one or more features of the medical imaging device fault; and a machine learning algorithm configured to receive one or more features of the medical imaging device fault, the machine learning algorithm being trained to output a prediction result comprising a fault probability for each of the plurality of subsystems of the medical imaging device, a fault probability indicating a likelihood that the fault of the medical imaging device originated from the subsystem; and a processor configured to determine, for each log file, a relevance score based on the obtained prediction result. In this aspect, the processor is further configured to:

generate a prioritized list of the log files based on the determined relevance of the plurality of log files; and transmit the log files in the prioritized list over a data communication channel to a remote processing device, and in a priority order defined by the prioritized list, the remote processing device being configured for analysing the transmitted log files and for diagnosing the fault of the medical imaging device based on a result of the analysing The system may be remotely located from a user device for analyzing and/or diagnosing a medical imaging device fault. In this way, a user (such as a service engineer) may have an appropriately arranged system that can receive information about the relevance and/or priority of log files at a location remotely located from the system. Embodiments may therefore enable a user to dynamically adjust or adapt log file retrieval using a local system (which may, for example, comprise a portable display device, such as a laptop, tablet computer, mobile phone, PDA, etc.). By way of example, embodiments may provide an application for a mobile computing device, and the application may be executed and/or controlled by a user of the mobile computing device.

The system may further include: a server device comprising the system for determining the relevance of log files; and a client device comprising a user-interface. Dedicated data processing means may therefore be employed for the purpose of determining the relevance of log files and/or determining severity of a fault of a medical imaging device, thus reducing processing requirements or capabilities of other components or devices of the system.

The system may further include a client device, wherein the client device comprises the data interface, natural language processing component, machine learning algorithm and a display unit. In other words, a user (such as a service engineer) may have an appropriately arranged client device (such as a laptop, tablet computer, mobile phone, PDA, etc.) which processes received data in order to determine log file relevance and generate a display control signal. Purely by way of example, embodiments may therefore provide a log file analysis system that enables prioritization of log files, wherein real-time communication between a user (e.g. service engineer) and a medical imaging device is provided and can have its functionality extended or modified according to proposed concepts, for example.

It will be understood that processing capabilities may therefore be distributed throughout the system in different ways according to predetermined constraints and/or availability of processing resources.

One or more concepts are provided for optimizing the provision (e.g. download or transmission) of log files for medical image device fault diagnostics. By way of example, proposed embodiments may address the issue of excessive waiting time for an engineer to receive log files. Time spent downloading the irrelevant (or less relevant) log files may be reduced or minimized. Also, when there are concurrent requests, factors such as severity of the problem, size of log files, relevance of log files to the problem, size of log files may be taken into consideration in order to improve or optimise log file prioritisation.

These and other aspects of the invention will be apparent from and elucidated with reference to the embodiment(s) described hereinafter.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which:

7

Figure 1:
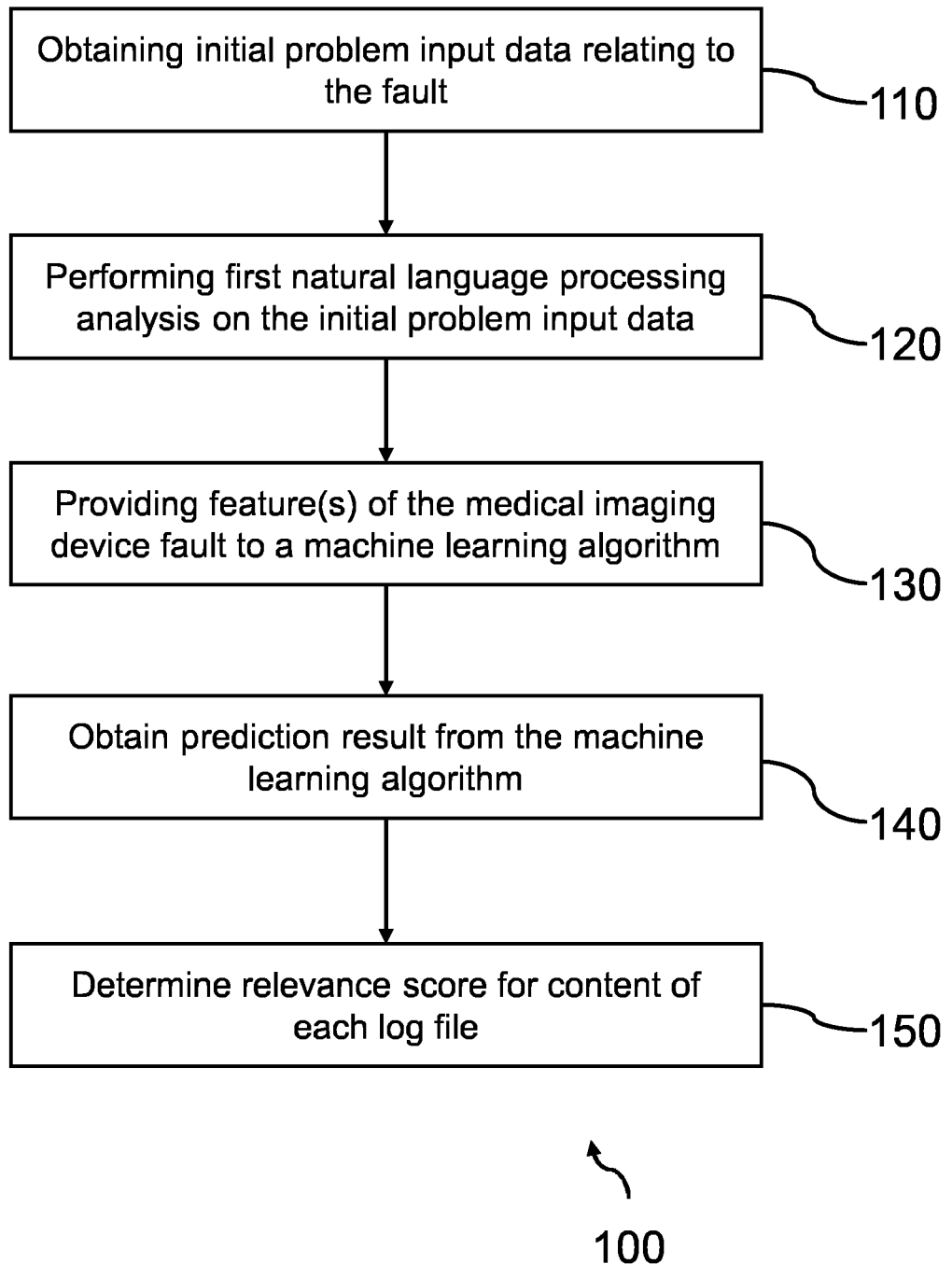
Figure 2:
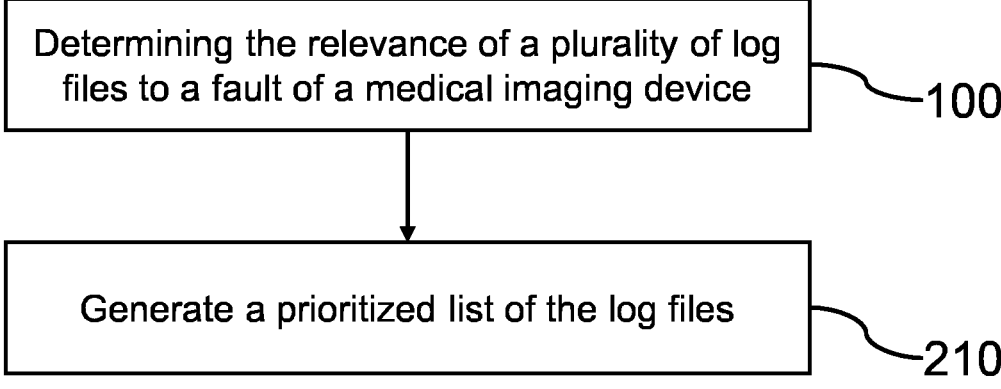
Figure 2:
Figure 3:
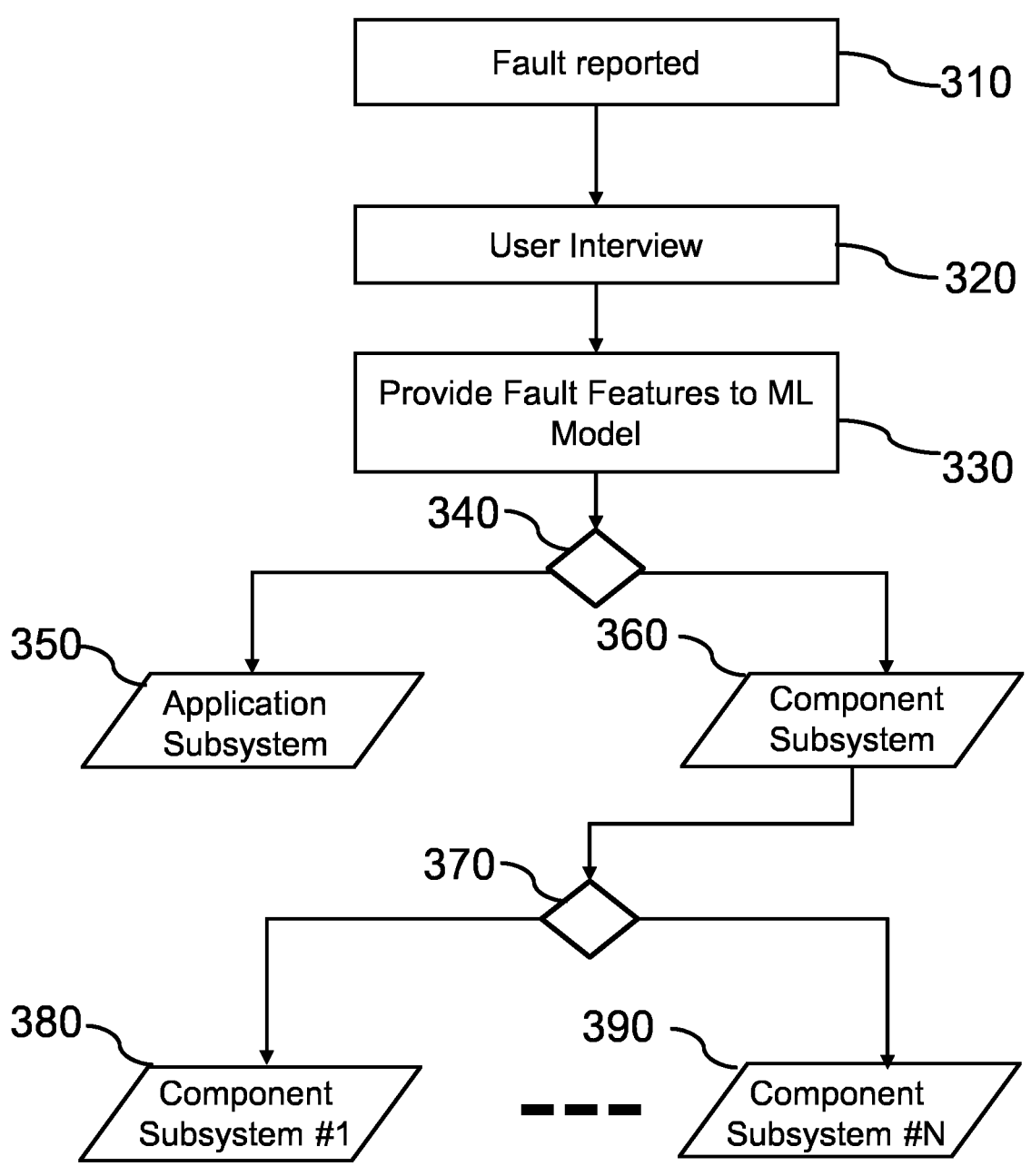
Figure 4:
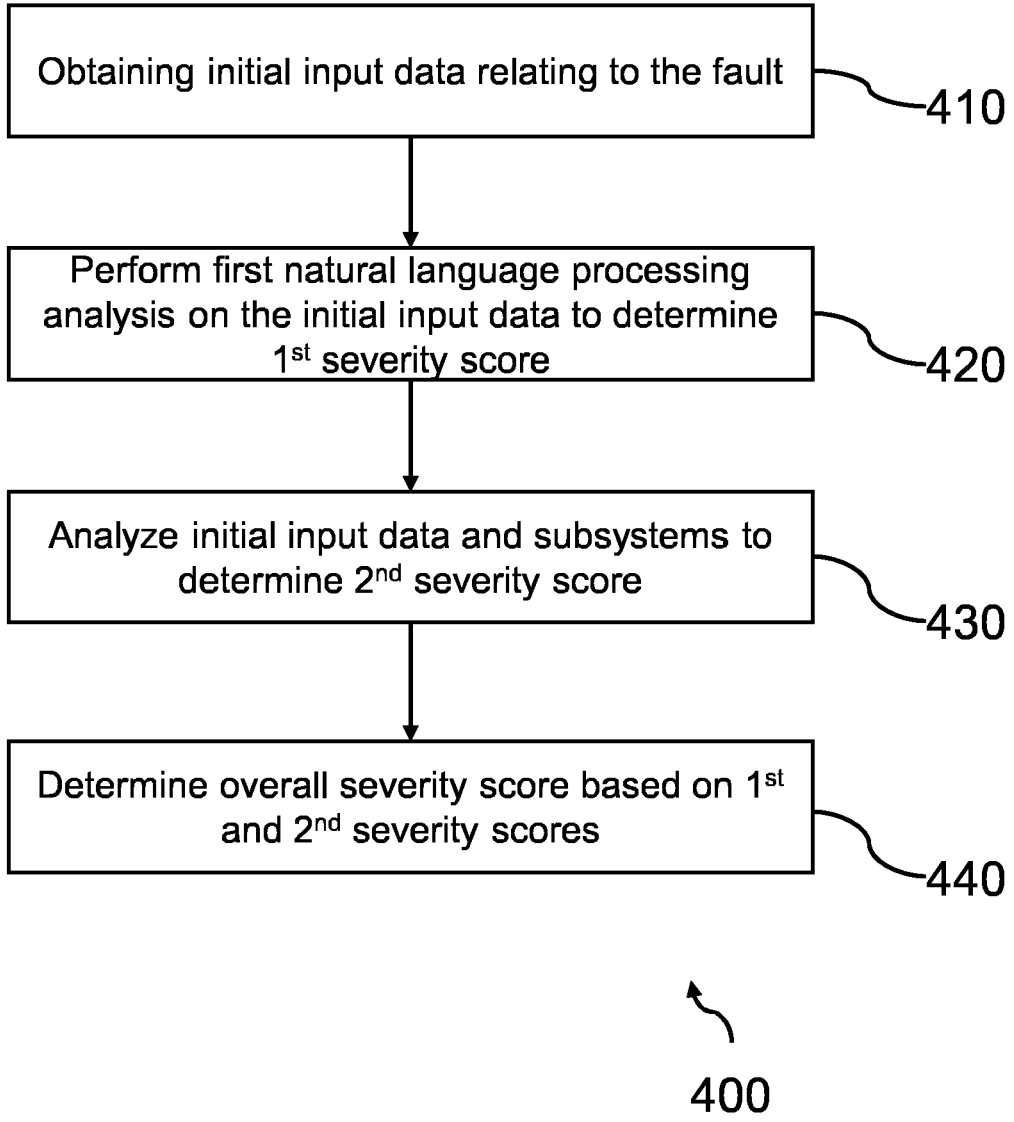
Figure 5:
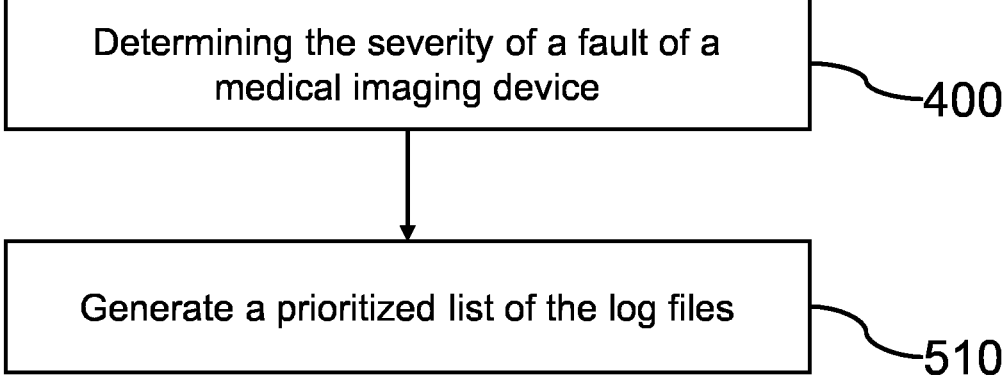
Figure 5:
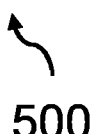
Figure 6:
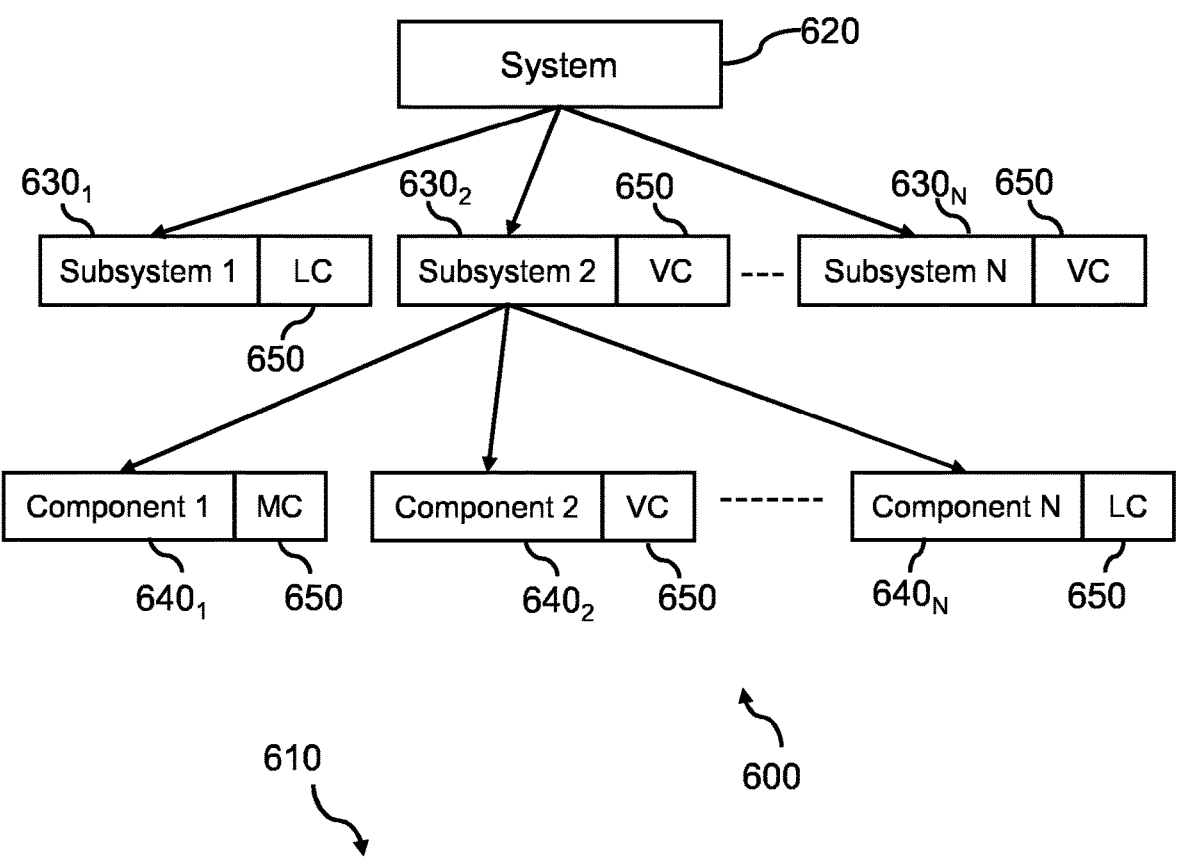
Figure 7:
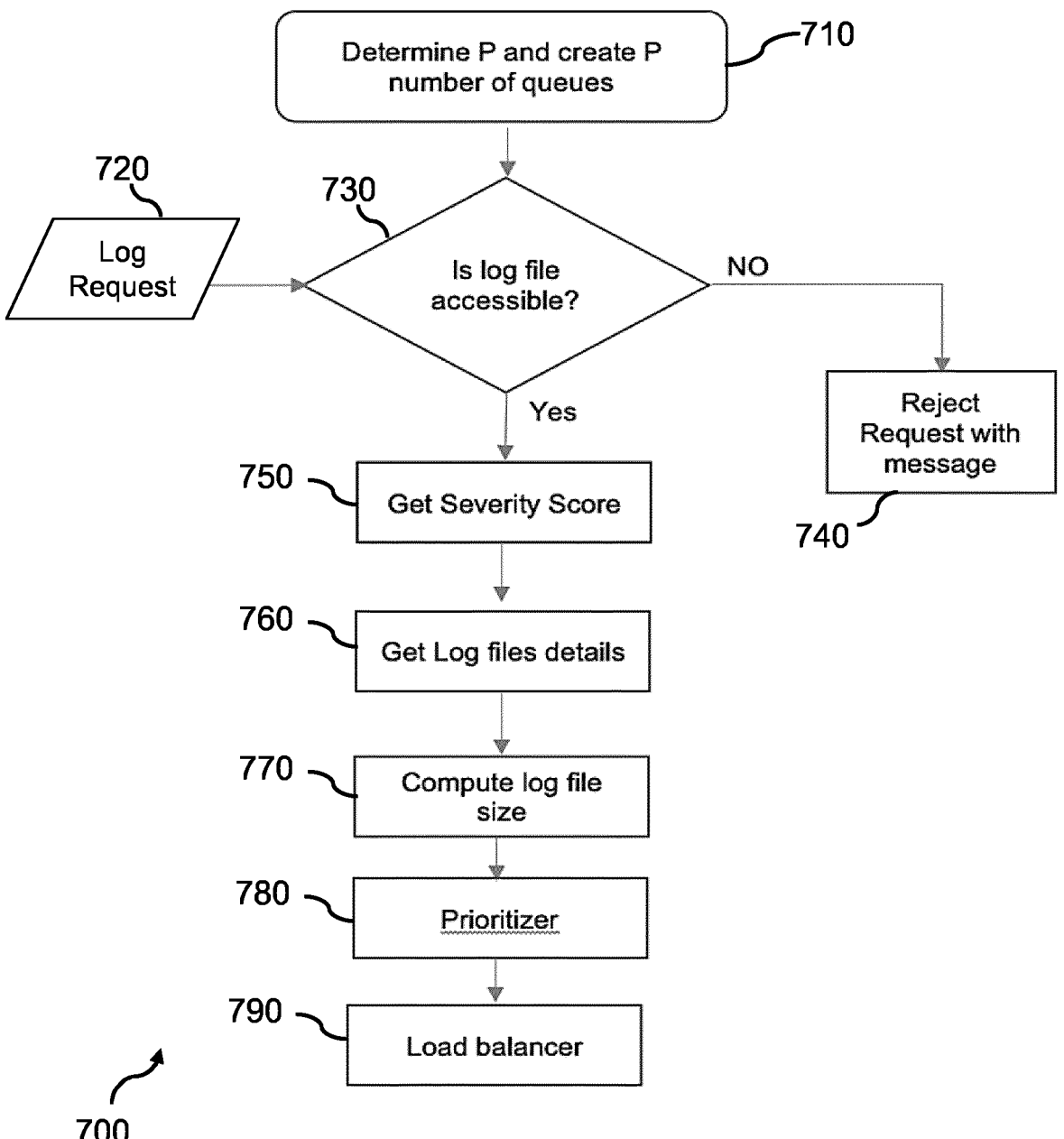
Figure 8:
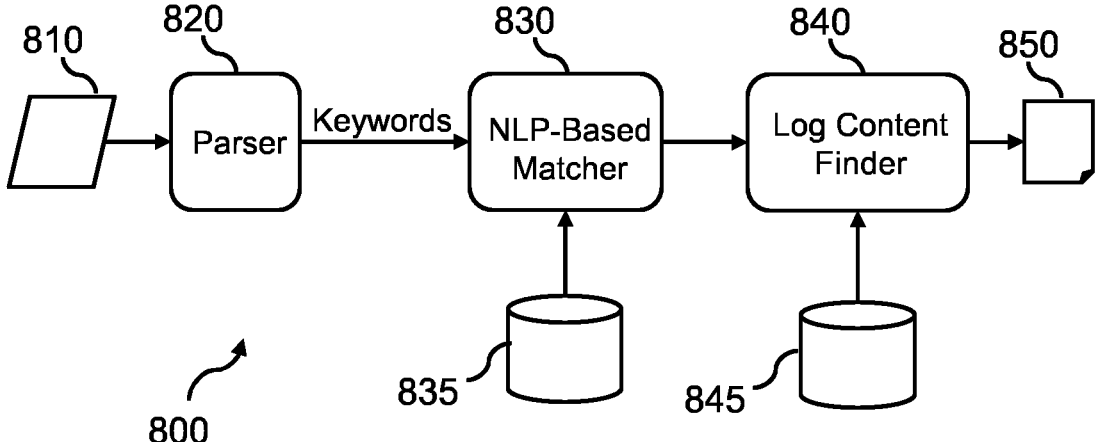
Figure 9:
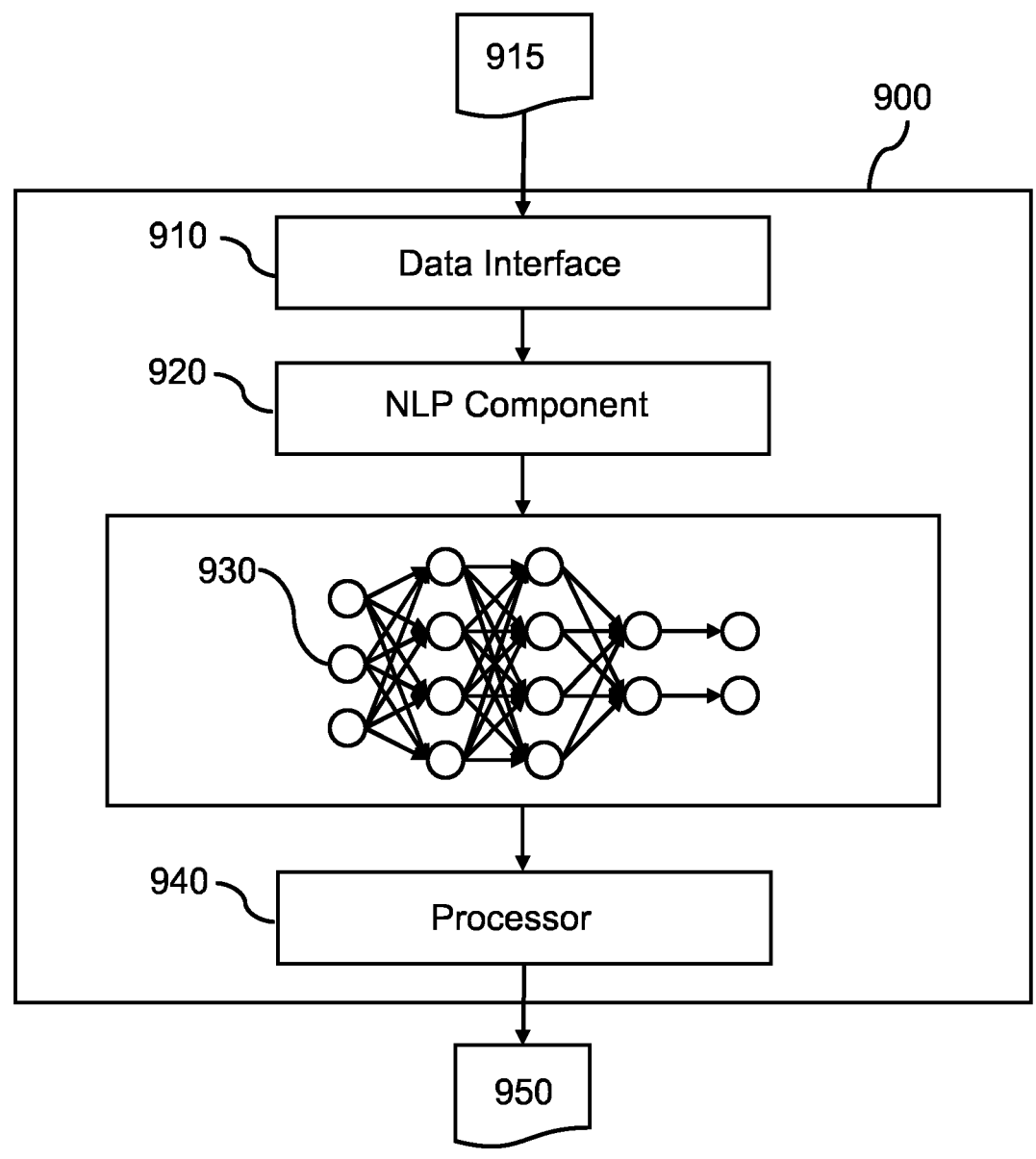
Figure 10:
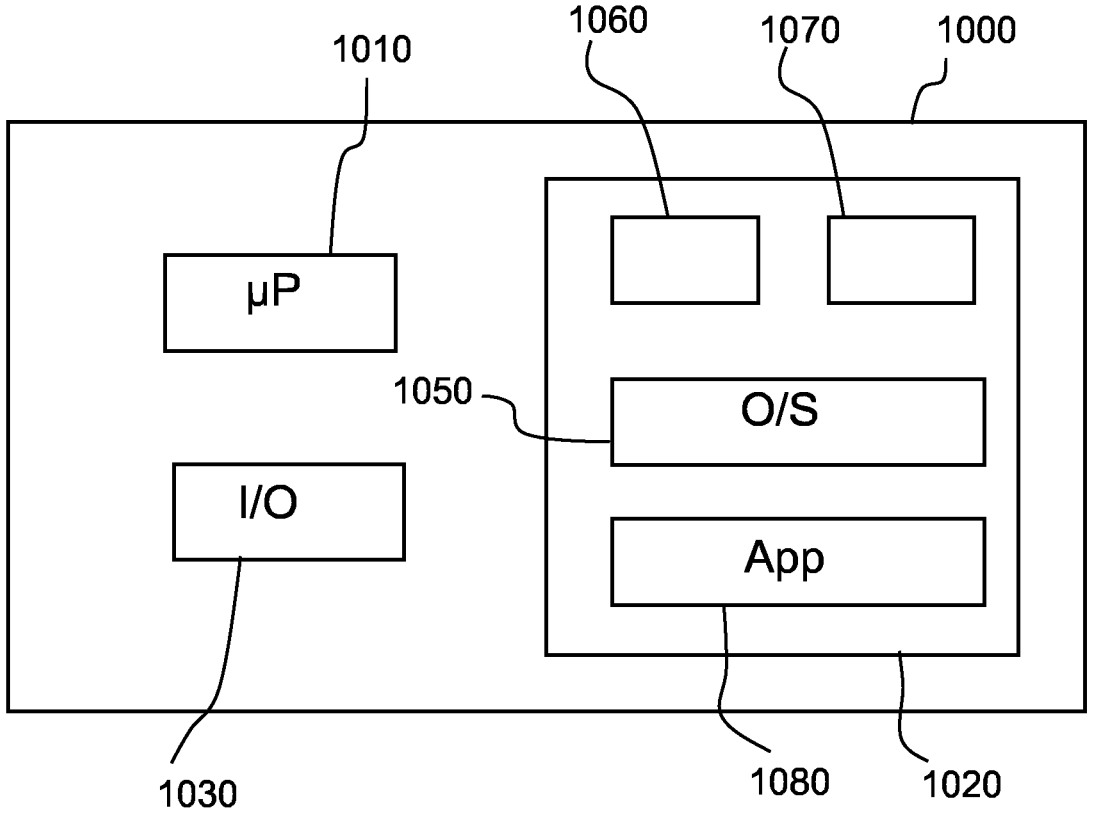

FIG. 1 is a flow diagram of a method for determining the relevance of log files to a fault of a medical imaging device according to an embodiment;

FIG. 2 is a flow diagram illustrating the use of the method of FIG. 1 in a method for diagnosing a fault of a medical imaging device according to an embodiment;

FIG. 3 is a simplified flow diagram of part of a method for diagnosing a fault of a medical imaging device according to an embodiment;

FIG. 4 illustrates an embodiment of a method for determining severity of a fault of a medical imaging device comprising a plurality of subsystems;

FIG. 5 illustrates the use of the method of FIG. 4 in a method for diagnosing a fault of a medical imaging device according to an embodiment;

FIG. 6 shows an exemplary Severity Knowledge graph along with weights table for different critical tags;

FIG. 7 is a simplified flow diagram of a method for fault diagnosis according to an embodiment;

FIG. 8 is a simplified block diagram of a system for fault diagnosis of a medical imaging device according to an embodiment;

FIG. 9 depicts a simplified block diagram of a system for determining the relevance of log files to a fault of a medical imaging device according to an embodiment; and FIG. 10 is a simplified block diagram of a computer within which one or more parts of an embodiment may be employed.

DETAILED DESCRIPTION OF THE
EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

The invention proposes concepts for aiding fault diagnosis of a medical imaging device. In particular, embodiments may provide a method and/or system which predicts a relevance of log file content to a fault. Based on the predicted relevance of log file content, the provision of log files to an engineer may then be prioritised for example.

Proposed concepts may be based on a realisation that different log files and/or certain log file content may be of different relevance to a particular fault. The relevance of log files and/or content provided therein may be identified in order to assist in the selection and/or provision of log file content for fault diagnosis. In this way, irrelevant log file content may therefore be identified and de-prioritised, thus reducing unnecessary data retrieval/downloading. For instance, embodiments may facilitate the identification and prioritisation of the most relevant log file content for a particular fault, thus enabling its accelerated provision to an engineer. Accordingly, embodiments may be used in relation to medical imaging fault analysis and/or diagnosis.

Also proposed is a concept for determining severity of a fault of a medical imaging device. This may then also be used to prioritize the provision of log file content to an engineer Using the concepts presented above, there may also be provided concepts for diagnosing a fault of a medical imaging device. That is, the proposed concept(s) for determining the relevance of log files to a fault of a medical imaging device may also be combined with the proposed concept(s) for determining a severity of the fault of the medical imaging device. Based on the determined relevance of the plurality of log files and the determined severity of the fault of the medical imaging device, a prioritized list of the log files may be generated. Put another way, the combined use of log file relevance determination and fault severity determination may be employed to prioritize the provision of log file content to an engineer for assisting fault diagnosis of a medical imaging device.

Proposed embodiments may thus facilitate improved (e.g. quicker and/or easier) fault analysis and/or diagnosis through the improved provision of relevant information to an engineer. Embodiments of the present invention are therefore directed toward enabling the improved provision of log file content for fault diagnosis of a medical imaging device.

By way of example only, illustrative embodiments may be utilized in many different types of clinical, medical or subject-related environments, such as a hospital, doctor's office, ward, care home, person's home, etc. Illustrative embodiments may, for example, be employed in digital pathology platforms as a clinical decision support system.

FIG. 1 illustrates an embodiment of a computer-implemented method 100 for determining the relevance of log files to a fault of a medical imaging device, wherein the medical imaging device comprises a plurality of subsystems, and each log file is associated with a respective subsystem of the medical imaging device.

The method begins with step 110 of obtaining initial problem input data relating to the fault of the medical imaging device. Here, step 110 of obtaining initial problem input data comprises receiving, via in input interface, initial problem input data provided by a respondent (e.g. engineer) in response to a request for data. In particular, the request for data comprises a fault analysis questionnaire provided to an engineer (e.g. via a user interface). Responses of the engineer to the questions of the questionnaire are thus obtained as initial problem input data and used to to identify one or more features of the fault.

Next, at step 120, a first natural language processing (NLP) analysis is performed on the initial problem input data to identify one or more features of the medical imaging device fault. The NLP analysis processes natural language description(s) of the fault, thereby facilitating the identification of features/aspects of the fault from information provided in a simple and intuitive manner.

At step 130, the one or more features of the medical imaging device fault are provided to a neural network (NN)-based machine learning algorithm. The machine learning algorithm is trained to predict, for each of the plurality of subsystems of the medical imaging device, a fault probability indicating a likelihood that the fault of the medical imaging device originated from the subsystem.

The structure of an artificial NN (or, simply, neural network (NN)) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

There are several types of neural network, such as convolutional neural networks (CNNs) and recurrent neural networks (RNNs). The exemplary embodiments of FIG. 1 employs a CNN-based learning algorithm, as CNNs have proved to be particularly successful at analyzing natural-language based features, and are able to classify data derived from natural-language at much lower error rate than other types of neural network.

CNNs typically contain several layers, including a convolutional layer, a pooling layer, a fully connected layer and a softmax layer. The convolutional layer consists of a set of learnable filters and extracts features from the input. The pooling layer is a form of non-linear down-sampling, reducing the data size by combining the outputs of a plurality of neurons in one layer into a single neuron in the next layer. The fully connected layer connects each neuron in one layer to all the neurons in the next layer. The softmax layer determines a probability distribution for each output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. +1%) to the training output data entries. This is commonly known as a supervised learning technique.

For example, weightings of the mathematical operation of each neuron may be modified until the error converges. Known methods of modifying a neural network include gradient descent, backpropagation algorithms and so on.

The training input data entries for the machine learning algorithm used in method 100 correspond to example features of a fault of a medical imaging device. The training output data entries correspond to probabilities, for each of the plurality of subsystems of the medical imaging device, indicating a likelihood that the faults of medical imaging device originated from the subsystem. That is, the machine learning algorithm is trained using a training algorithm configured to receive an array of training inputs and respective known outputs, wherein a training input comprises one or more features of a fault of a medical imaging device and respective known output comprises, for each of the plurality of subsystems of the medical imaging device, a fault probability indicating a likelihood that the fault of medical imaging device originated from the subsystem. In this way, the machine learning algorithm is trained to output a fault probability prediction for each log file when provided with one or more features of a fault of a medical imaging device The CNN-based learning algorithm may, for example be produced by modifying one or more existing CNN-based learning algorithms, such as VGG, Inception and ResNet.

Also, in this example, the machine learning algorithm comprises a binary classifier that is trained to make a decision about the fault of the medical imaging device originating in a software subsystem or a hardware subsystem. Such dividing of part of the classification into a binary decision can simplify probability analysis.

At step 130, a prediction result is obtained from the machine learning algorithm. The prediction result comprises a fault probability for each of the plurality of subsystems of the medical imaging device.

Finally, at step 140, for content of each log file, a relevance score is determined based on the obtained prediction result. Specifically, in the exemplary embodiment of FIG. 1, the step of determining, for content of each log file, a relevance score comprises: determining, for content of each log file, system relevance scores indicating a relevance of the log file to each of the subsystems; determining, for each subsystem, an error probability indicating a probability that the fault of the medical imaging device relates to the subsystem; and processing the system relevance scores and error probabilities to obtain, for content of each log file, a relevance score.

FIG. 2 illustrates the use of the method of FIG. 1 in a computer-implemented method 200 for diagnosing a fault of a medical imaging device according to an embodiment.

The method 200 begins with implementing the method 100 of FIG. 1 as described above, from which the relevance of a plurality of log files to a fault of a medical imaging device is determined.

Next, the method proceeds to step 210 in which a prioritized list of the log files is generated based on the determined relevance of the content of the plurality of log files. That is, prioritization of the log files is determined according to the relevance of the plurality of log files predicted by the embodiment of FIG. 1.

Optionally, the method for diagnosing the fault of the medical imaging device further includes:

transmitting the log files in the prioritized list over a data communication channel to a remote processing device, and in a priority order defined by the prioritized list, the remote processing device being configured for analysing the transmitted log files and for diagnosing the fault of the medical imaging device based on a result of the analysing.

In this example, the transmission of the log files over the data communication channel facilitates the analysis, and also the diagnosis, of the fault of the medical imaging device at the remote processing device. This obviates the need for a service engineer to be present at the location of the medical imaging device in order to perform a diagnosis of its fault. The transmission of a prioritised list of the log files also reduces the amount of data that needs to be transmitted over the data communication channel. As compared to a practice of transmitting all log files to a remote location for analysis, this reduces the bandwidth demand that is associated with transmitting large files of log data over the communication channel. Moreover, by transmitting the log files in a priority order defined by the prioritized list, it is ensured that the most relevant log files arrive first at the remote processing device. The log files may then be analysed in the order of their priority. This also reduces the bandwidth demand associated with transmitting large files of log data over the communication channel and/or reduces the delay incurred in diagnosing the fault because the fault may already be diagnosed at the remote processing device after analysing only the most relevant log file(s), i.e. without the need to wait for all potentially relevant log files on the prioritised list to be transmitted. Consequently, the fault of the medical imaging device may be diagnosed in a more time-efficient manner.

In this example, the data communication channel may in general be provided by any data communication channel, including a wired communication channel, an optical communication channel, and a wireless communication channel. In other words, when a wired communication channel or an optical communication channel is used, the communication may take place via signals transmitted on an electrical or optical cable, and when a wireless communication channel is used, the communication may take place via RF or optical signals. The remote processing device includes one or more processors. The one or more processors may be shared within a networked processing architecture such as a client/server architecture, a peer-to-peer architecture, the Internet, or the Cloud.

In this example, the remote processing device may analyse the transmitted log files, and consequently identify the fault using various techniques. For instance, the transmitted log files may be analysed by using a pattern analyser to identify anomalous patterns in the data in the log files. For instance, for a given set of transferred log files, a fault may be diagnosed by identifying an anomalous sequence of instructions executed by the medical imaging device preceding the fault, matching this sequence with a known sequence of instructions that are associated with a known fault, whereupon the known fault may be identified as the fault for the set of transferred log files. Similarly, the transmitted log files may be analysed to identify an anomalous value/values of parameters of various operating conditions, such as for example temperature sensor readings for elements of the medical imaging device, motion speeds of various moving elements of the medical imaging device, anomalous configuration data, and so forth. The anomalous value(s) may be associated with a known fault of the medical imaging device, whereupon the known fault may be identified as the fault for the set of transferred log files. The analysis and diagnosis may be performed automatically by the remote processing device, or based at least in-part on user input. For instance, a service engineer may review the log files to identify anomalous sequences of instructions, or anomalous value/values of parameters as described above. The result of the analysis and diagnosis may thus be determined at the remote processing device. Optionally, the remote processing device may then transfer the result of the diagnosis back to the medical imaging device. Alternatively, a user, or a service engineer may view the result of the diagnosis, and determine any subsequent actions that may be necessary. The subsequent actions may for example include the need for an on-site inspection of the medical imaging device, or the need for further analysis of log files of the medical imaging device. For instance, the service engineer may request the transfer of additional log files from the medical imaging device over the data communication channel.

By way of further explanation of the propose concept(s) associated with the embodiments described above, an exemplary implementation will now be described with reference to the FIG. 3.

FIG. 3 is a simplified flow diagram of part of a method for diagnosing a fault of a medical imaging device according to an embodiment. The embodiment is considered in relation to a connected medical imaging device (such as a MRI, CT, iXR, etc.) that has the capability to send log files, over a data communication channel, via specific network connection/protocol. When a service engineer receives a customer call on system malfunction, the engineer can request the latest log files. Such log files contain various types of information such as system events, sensor measurements, system configuration data, etc. and may be in different formats (such as zip file, text file, window register files, etc.). Depending on the fault, not all information from these log files may be relevant for analysis and/or diagnosis of that specific fault.

The proposed initial process is to determine the problem scenario (as depicted in Figure) which consists of two main stages:

(i) Determining if the problem is application related (i.e., software problem) or component related (i.e., hardware problem)—e.g. binary classification; and (i) If the fault is component related, determining which sub-component(s) (also known as sub-systems) the fault has occurred in.

Based on the problem reported by a customer (step 310), a service engineer asks pre-defined questions to obtain an initial understanding of the fault/problem in step 320. The problem description and answers to the questions (i.e. a description of features of the fault) input to a machine learning algorithm that is trained using historical cases where the fault description and fault origin is known.

The machine learning algorithm employs first and second models. The first model is employed as a binary classifier for predicting (in step 340) the probability of the fault being related to an application-subsystem (i.e. software related) (350) or to a component-subsystem (i.e. hardware related) (360).

Where it is determined that the fault occurs in a component-subsystem (i.e. hardware), the second model of the machine learning model is used to calculate (in step 370), for each subsystem (component subsystem), a probability that the fault originated from that subsystem (component subsystem #1 (380) through to component subsystem #N (390).

Based on the fault scenario, a relevance score is then calculated for each log file.

By way of example, for a machine/system denoted by m, wherein the fault/error of system reported by a user may is denoted by e, wherein all available log files of that system are denoted by F, for each log file $f \in F$, the relevance score of f can be calculated using the following equation (Equation (i)):

$$R(e, m, f) = R_{comp}(f) P_{comp}(e, m) + \sum_{i=1}^{n} R_{sub_i}(f) P_{sub_i}(e, m) \qquad (i)$$

where $R(e,m,f)$ is the relevance score of log file f for the system m with the fault e, and where $R_{comp}(f)$ indicates how relevant f is for a component related problem. $R_{sub_i}(f)$ indicates how relevant f is for a problem relate to subsystm$_i$. $P_{comp}(e,m)$ is the probability of e being component-related. $P_{sub_i}(e,m)$ is the probability of e related to subsystm$_i$ It is also proposed that, in the context of customized provision of log file content, estimating the severity of the fault may be of importance. When a fault is reported, there may be several factors/parameters that contribute to determining the severity of the problem. Examples of such factors/parameter may include the following: problem description by a user; install base information; and contract details with the user (e.g. service level agreement). Embodiments may be configured to derive intermediate severity scores such factors and, based on these scores, estimate a final severity score for a particular fault.

By way of example FIG. 4 illustrates an embodiment of a computer-implemented method 400 for determining severity of a fault of a medical imaging device comprising a plurality of subsystems.

The method 400 comprises a first step 410 of obtaining initial input data from a user relating to the fault of the medical imaging device. Here, step 410 of obtaining initial input data comprises receiving, via in input interface, initial input data provided by a user (e.g. customer) in response to a request for data. In particular, the request for data comprises a set of questions provided via a user interface. Responses to the questions are thus obtained as initial input data.

In step 420, a first natural language processing analysis is performed on the initial input data to determine a first severity score relating to a description of the fault. Examples of the severity scores may derived are provided below.

In step 430, the initial input data and the plurality of subsystems are analysed to determine a second severity score relating to the subsystems of the medical imaging device. By way of example, four parameters on which individual severity may be calculated are: problem description by user (e.g. technical components/subsystems mentioned in the description, and vocabulary/sentiment analysis); install base information; contract details with the user; and an engineer's findings with respect to severity. These four severity scores may then be then combined to calculate an overall severity score.

Finally, in step 440, an overall severity score is determined based on the first severity score and the second severity score.

FIG. 5 illustrates the use of the method of FIG. 4 in a computer-implemented method 500 for diagnosing a fault of a medical imaging device according to an embodiment. The method 500 begins with implementing the method 400 of FIG. 4 as described above, from which a severity of the fault of a medical imaging device is determined.

Next, the method proceeds to step 510 in which a prioritized list of the log files is generated based on the determined severity of fault. That is, prioritization of the log files is determined according to the severity of the fault predicted by the embodiment of FIG. 4.

Although not detailed in the embodiment of FIG. 4, other embodiments may also comprise determining a third severity score relating to a priority of a user of the medical imaging device. The step 440 of determining an overall severity score may then be further based on the third severity score. In this way, such embodiments may account for different users, thus facilitating dynamic adaptation of results according to a user's credential for example.

Some embodiments may also comprise applying a weighting to the overall severity score based on at least one of: the first severity score; the second severity score; and a parameter value of a log file identified for the fault. This may cater for situations where multiple reported issues get a similar severity score. For instance, calculation of a final weighted score may account for factors (e.g. log file size) that may influence a preference for log file provision. The severity of a fault may be given a high weighting value according to some factors (e.g size of a log file, where a smaller log file may be given a higher weighting value), whereas other factors may result in a lower weighting value being applied (e.g. size of a log file, where a bigger log file may be given a lower weighting value).

Purely by way of further explanation and example, how severity scores may be derived based on factors mentioned above will be described.

Severity scoring based on fault description (severity$_{fault-description}$)

An initial step for determining a severity of a reported fault may be analyze the description of the fault received from a user, as described above with reference to the embodiment of FIG. 4. The severity may be understood from the fault description in two steps: (i) by assessing severity from the technical components mentioned in the fault description; and (ii) analysing the vocabulary/sentiment in the fault description. That is, the following equation may be employed:

$$\text{Severity}_{fault-description} = \text{severity}_{technical-comp} + \text{severity}_{vocab-sentiment} \quad (ii)$$

(i) Severity Assessment based on Technical Components (severity$_{technical-comp}$):

To assess the severity based on technical components, technical components (system, sub system, components etc.) are identified along with any related keywords mentioned in the fault description text. Once that is identified, a Severity Knowledge Graph is consulted to determine the grade of severity.

By way of example, FIG. 6 shows an exemplary Severity Knowledge graph 600 along with weights table 610 for different critical tags. A Severity Knowledge Graph is a graph 600 having nodes which represent system 620, subsystems 630 and corresponding components 640 in a hierarchical manner. This severity/criticality tag 650 of a node is determined based on the domain specific knowledge for each system. For each such critical tag, a weight is predetermined based on their criticality and severity. Based on this graph, the severity is calculated for the technical components mentioned in the fault description.

(ii) Severity Assessment based on vocabulary/sentiment analysis (severity$_{vocab-sentiment}$)

Further, the fault description text can be analysed to understand the urgency or severity mentioned by the user. Using NLP, the text of the fault description is analysed and determine the sentiment to ascertain an indication of the urgency/severity text and then a severity score is assigned with respect to that findings.

Severity scoring based on Install based information(severity$_{install\_base}$):

An additional factor that may be considered to severity assessment of a reported fault may be install base information for the particular system/machine. Different parameters, such as number of unit of the system, patient load, type of department where the system is installed, etc. may be important for the purpose of assessing the fault severity.

A knowledge base can be created with such parameters and their severity weights. Such a knowledge base may be represented as table, e.g. Table 1 below.

TABLE 1

| Install Base Parameters | Sub-Parameters | Weights |
| --- | --- | --- |
| Number of Units | Single | W1 |
| | Multiple | W2 |
| Department | Emergency | W3 |
| | Others | W4 |

TABLE 1-continued

| Install Base Parameters | Sub-Parameters | Weights |
|---|---|---|
| Patient Load per Day | <100 | W5 |
|  | >100 | W6 |
| . . . | . . . | . . . |
| . . . | . . . | . . . |

Based on the knowledge base and weight distribution, a severity score with respect to install base (severity$_{install\text{-}base}$) is determined, e.g. according to the following equation:

$$severity_{install\_base} = \sum (W_1 * install\_base\_param_1) \qquad \text{(iii)}$$

Severity scoring based on contract details (severity$_{contract\text{-}details}$)

With respect to serviceability and maintenance, different types of contracts may be agreed for different users. Based on these contracts (e.g. service level agreements), different users may have different levels of priority during serviceability related problems. A severity score may be derived from this priority, i.e. with respect to the contract details Severity scoring based on remote service engineer (RSE) findings (severity$_{RSE\text{-}findings}$):

Once the user reports a fault, the RSE can further ask questions to improve an understanding of the severity of the fault. Based on the questions-answers pairs and a summary report from the RSE about his/her understanding, a severity score may be derived from RSE's findings.

With all of the abovementioned severity score components, an overall/final severity score (severity$_{final}$) for the fault can be determined according to the following equation:

$$severity_{final} = severity_{fault\text{-}description} +$$
$$severity_{install\_base} + severity_{contract\text{-}details} + severity_{RSE\text{-}findings}$$

As already detailed above, it is further proposed that the provisioning of log file content may be prioritised based on both log file content relevance and fault severity. That is, the proposed concept(s) for determining the relevance of log file content to a fault of a medical imaging device may also be combined with the proposed concept(s) for determining a severity of the fault of the medical imaging device.

For example, there may be a need to maintain an prioritize a log file download queue. This may, for instance, be required when multiple concurrent faults are reported. To cater to multiple requests at a time, a set of RMEs may work on different issues (M number) and one RME may be working on more than one issue at a time (total N number). However, there are typically a fixed number of connections from which log data can be downloaded (P number). Hence, prioritization is needed because N>=M>=P.

By way of example, prioritization of the log file content download may be undertaken according to the method illustrated in FIG. 7.

FIG. 7 is a simplified flow diagram of a method 700 for fault diagnosis according to an embodiment.

As shown in the flow chart of FIG. 7, the first step 710 is to create P number of queues that corresponds to number of connections available to download log files from remote systems. Once the queues are available, a request for log download is received in step 720.

Responsive to the request arriving, step 730 is undertaken to check if a given system is accessible or not for extracting the log data. Even if a system is not working, the log may be accessible as there is different software component that is responsible for log push from system to requester. If the log is not accessible, an appropriate message is sent, in step 740, to the requester and process is ended. If log can be accessed, the method proceeds to steps 750-790.

In step 750, the severity score of the fault is determined according to a proposed embodiment (e.g. the method presented with reference to FIG. 4 above).

In step 760, log file details including number of files and portion of each file is received by using process mentioned in below section.

Then, in step 770, the size of each log file (in KBs) is computed. This step is done by referring to existing log files in the repository and extracting same number of line/portion of the files and computing the size. The output of this step 770 is total log file size (in KBs) that would be needed to when download is initiated.

Next, in step 780, a prioritizer uses information about the relevance (R) of log file content (as determined according to a proposed embodiment, e.g. the method presented with reference to FIG. 1 above), in combination with the severity score (S) from step 750 and the log file size (L) to determine the priority of the request.

An exponential function may be employed to define the priority according to the following equation:

$$Pr = \text{Slope}\left(\frac{R+S}{L}\right)$$

where Pr is computed priority of the request, R is the relevance of the file, the S is severity of the issue, L is log size. Hence, as severity increase the steepness of the exponential curve increases hence slope will be higher. However, if log size "L" is very high then even if severity is high the overall value will be moderate.

In the final step 790, a load balancer uses the priority value along with queue details (like current size of queue, restrictions on a queue with connection of certain systems (e.g. some connections can be dedicated to certain regions only), max/min/average speed of download, etc.) and a queuing algorithm to push the current request to an appropriate queue and queue position. For this, known task algorithms, like "fair queuing" or stochastic resource allocation algorithm may be used.

Problem Specific Log Content Finder

In attempting to optimise log content provision, a relevant consideration may be to employ a methodology that determines a particular part/section of a log file (or particular log file in a multiple log file scenario) that needs to be downloaded based on underlying fault description. This may be achieved by employing a "Problem Specific Log Content Finder" model that is explained with reference to FIG. 8.

FIG. 8 is a simplified block diagram of a system for fault diagnosis of a medical imaging device according to an embodiment. The illustration of FIG. 8 provides a high-level architecture in which the input 730 is textual fault description (e.g. from a user and/or remote service engineer). The output 850 is either a list of log files that are relevant to said problem (in case of multiple log files) or pointers to relevant sections of a log file (in the case of single log file), or a combination of both. In the following sections, the units of the system 800 are described.

Fault Description Parser-820

The parser 820 is configured to receive the fault description in textual format as input. From the fault description, the parser 820 extracts and outputs a set of keywords relating to the fault.

The parser 820 employs a frequency-based technique to eliminate most frequently used common words that are not specific to a given subject. Once generic words are removed, non-generic words that are specific to this domain (i.e. healthcare devices service domain) are processed via a "Word to Vector" processor of the parser 820. The "Word to Vector" processor uses combination of continuous bag of words technique and skip gram techniques to get vectors. The words with vectors have features above thresholds are considered as keywords. The continuous bag of words technique of "Word to Vector" uses a negative log likelihood of a word given a set of context is computed according to the following equation:

$$-\log\left(p\left(\frac{w_0}{w_i}\right)\right)$$

where $p\left(\frac{w_0}{w_i}\right)$ is given as:

$$p(w_O \mid w_I) = \frac{\exp(v'_{w_O}{}^T v_{w_I})}{\sum_{w=1}^{W} \exp(v'_{w}{}^T v_{w_I})}$$

wherein: $w_o$ is output word: $w_i$ is context words

NLP Based Matcher-830

The NLP Based Matcher 830 takes two inputs: keywords from the parser 820; and data from a 'system architecture and components relation's hierarchical graph' 835.

The hierarchical graph is built using following engineering and design documents:

requirement documents, low-lever/high-level design documents, and verification and validation documents. These documents are taken at each level. For example, documents from sub-system level are considered to fetch sub-system level details, like names and functionalities. Similarly, for other levels these documents are used to process them and pull relevant parts. The TF-IDF technique is used to get the details. Using outcome of this processing the nodes of graph are formed. To form connections the traceability matrix of covering from requirement to validation is used that gives mapping and relationship between different elements of the system.

The output of the NLP Based Matcher unit 830 is a list of components. This list of components is generated by following steps:

An input keyword is taken and graph is searched in breadth first fashion

The keyword is compared with graph node content

For comparing both words cosine similarity is used

Any match crossing a threshold is considered

The matched graph node name compared with list of components already selected, if not present then it is added to list From matched graph node first degree of connectivity is explored All the nodes that are at first degree of connectivity are added to component list if they are not present already The process is repeated with new input keyword The process is stopped when all the input keywords are over or all the nodes of graph are added to component list The component list is sent to next unit in the pipeline

Content to Log file Mapping Database 845

The Content to Log file Mapping Database 845 is database that holds information describing the mapping of actual log file details, like the file name, starting line number range, ending line number range, Scan words and corresponding mapping of the log content keywords. An exemplary format of such stored information may be as in the following table, Table 2:

TABLE 2

| Log file Name | Startling line number range | Ending line number range | Scan Words | Content Keyword |
|---|---|---|---|---|
| Log1.txt | 54-102 | 112-215 | Acquisition, scan, abort, image | Acquisition |
| Log2.txt | 1827-1989 | 2034-2245 | Keypad, entry, character limit, alpha numeric | Keypad |

The Content to Log file Mapping Database 845 is populated by crawling code base at each sub-system level and using content keywords as pivot points.

Using content keywords, the code boundary is detected first, the code can lie in different files. The detected code is scanned for logging information (e.g. all kinds of log data: warning, errors, information etc.) and this data is then arranged in the sequence of control flow. The entries of this data is used to find range of starting line number in a vast set of existing log files that is already collected from different systems across install base, wherein an initial 25% of the entries are considered to find the starting line.

Using log entries that are collected from source code, the scan words are determined. A word is considered as scan word only when it is not a generic word like "the", "is", "etc." and the word is not generated dynamically. Then, using Starting line number range and scan words, the Ending line number range is determined.

To determine ending line number range, the bottom 25% of entries of the collected log data from source code is considered. If any of these entries fall in the starting line number range then, 110% of max of startling line number range is considered as minimum value of ending line number range. From this point/bottom 25% entries point, the install base log data is scanned using scan words. As long as scan words appear in the log data of install base and log data is part of code range the maximum value of ending line range will keep on increasing. This process is repeated for all types of content words and database is populated.

Log Content Finder 340

The Log Content Finder 340 receives two types of input: the output of the NLP Based Matcher 830; and data from the Content to Log file Mapping Database 845. The output of the Log Content Finder 340 is a list of relevant log files, section of log file that is relevant or a combination of both.

The data from the Content to Log file Mapping Database 845 contains content keywords. This is used to map to a list of components that is received from the NLP Based Matcher 830. The mapping of component's list with content keywords is achieved by using NLP based matter like word-to-vector. Where the vectors that have highest similarities in their properties are considered as matched. The keywords are used to fetch log file details from the database as database has details like starting line of the log file, ending line of the log file and log file name.

Thus, the output from the system 800 is a list 850 of relevant log files, section(s) of log file(s), or a combination of both.

By of summary of a proposed implementation, FIG. 9 depicts a simplified block diagram of a system 900 for determining the relevance of log files to a fault of a medical imaging device, wherein the medical imaging device comprises a plurality of subsystems, and wherein each log file is associated with a respective subsystem of the medical imaging device.

The system comprises a data interface 910 that is configured to obtain initial problem input data relating to the fault of the medical imaging device. As detailed above, the initial problem input data may comprise textual description of the fault provided by a user.

The system also comprises a natural language processing component 920 that is configured to perform a first natural language processing analysis on the initial problem input data to identify one or more features of the medical imaging device fault.

A machine learning algorithm 930 of the system 900 is configured to receive one or more features of the medical imaging device fault. The machine learning algorithm is trained to output a prediction result comprising a fault probability for each of the plurality of subsystems of the medical imaging device. Here, a fault probability indicates a likelihood that the fault of the medical imaging device originated from the subsystem.

The system 900 also comprises a processor 940 that is configured to determine, for each log file, a relevance score based on the obtained prediction result. The relevance score for each log file is provided as an output 950 from the system 900, and may be used for prioritising the provision of log file content to a user (e.g. remote service engineer).

The processor 940 is further configured to:

generate 120 a prioritized list of the log files based on the determined relevance of the plurality of log files; and transmit the log files in the prioritized list over a data communication channel to a remote processing device, and in a priority order defined by the prioritized list, the remote processing device being configured for analysing the transmitted log files and for diagnosing the fault of the medical imaging device based on a result of the analysing.

FIG. 10 illustrates an example of a computer 1000 within which one or more parts of an embodiment may be employed. Various operations discussed above may utilize the capabilities of the computer 1000. For example, one or more parts of a system for providing a subject-specific user interface may be incorporated in any element, module, application, and/or component discussed herein. In this regard, it is to be understood that system functional blocks can run on a single computer or may be distributed over several computers and locations (e.g. connected via internet).

The computer 1000 includes, but is not limited to, PCs, workstations, laptops, PDAs, palm devices, servers, storages, and the like. Generally, in terms of hardware architecture, the computer 1000 may include one or more processors 1010, memory 1020 and one or more I/O devices 1030 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a digital signal processor (DSP), or an auxiliary processor among several processors associated with the computer 1000, and the processor 1010 may be a semiconductor based microprocessor (in the form of a microchip) or a microprocessor.

The memory 1020 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the memory 1020 may include one or more separate programs, each of which comprises an ordered listing of executable instructions for implementing logical functions. The software in the memory 1020 includes a suitable operating system (O/S) 1050, compiler 1060, source code 1070, and one or more applications 1080 in accordance with exemplary embodiments. As illustrated, the application 1080 comprises numerous functional components for implementing the features and operations of the exemplary embodiments. The application 1080 of the computer 1000 may represent various applications, computational units, logic, functional units, processes, operations, virtual entities, and/or modules in accordance with exemplary embodiments, but the application 1080 is not meant to be a limitation.

The operating system 1050 controls the execution of other computer programs, and provides scheduling, input-output control, file and data management, memory management, and communication control and related services. It is contemplated by the inventors that the application 1080 for implementing exemplary embodiments may be applicable on all commercially available operating systems.

Application 1080 may be a source program, executable program (object code), script, or any other entity comprising a set of instructions to be performed. When a source program, then the program is usually translated via a compiler (such as the compiler 1060), assembler, interpreter, or the like, which may or may not be included within the memory 1020, so as to operate properly in connection with the O/S 1050. Furthermore, the application 1080 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 1030 may include input devices such as, for example but not limited to, a mouse, keyboard, scanner, microphone, camera, etc. Furthermore, the I/O devices 1030 may also include output devices, for example but not limited to a printer, display, etc. Finally, the I/O devices 1030 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1030 also include components for communicating over various networks, such as the Internet or intranet.

If the computer 1000 is a PC, workstation, intelligent device or the like, the software in the memory 1020 may further include a basic input output system (BIOS) (omitted for simplicity). The BIOS is a set of essential software routines that initialize and test hardware at start-up, start the O/S 1050, and support the transfer of data among the hardware devices. The BIOS is stored in some type of read-only-memory, such as ROM, PROM, EPROM, EEPROM or the like, so that the BIOS can be executed when the computer 800 is activated.

When the computer 1000 is in operation, the processor 1010 is configured to execute software stored within the memory 1020, to communicate data to and from the memory 1020, and to generally control operations of the computer 1000 pursuant to the software. The application 1080 and the O/S 1050 are read, in whole or in part, by the processor 1010, perhaps buffered within the processor 1010, and then executed.

When the application 1080 is implemented in software it should be noted that the application 1080 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 1080 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The methods of FIGS. 1-5 & 7, and the systems of FIGS. 8 and 9, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs) or graphics processing units (GPUs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Storage media may include volatile and non-volatile computer memory such as RAM, PROM, EPROM, and EEPROM, optical discs (like CD, DVD, BD), magnetic storage media (like hard discs and tapes). Various storage media may be fixed within a computing device or may be transportable, such that the one or more programs stored thereon can be loaded into a processor.

To the extent that an embodiment is implemented partly or wholly in hardware, the blocks shown in the block diagrams of FIGS. 8 and 9 may be separate physical components, or logical subdivisions of single physical components, or may be all implemented in an integrated manner in one physical component. The functions of one block shown in the drawings may be divided between multiple components in an implementation, or the functions of multiple blocks shown in the drawings may be combined in single components in an implementation. Hardware components suitable for use in embodiments of the present invention include, but are not limited to, conventional microprocessors, application specific integrated circuits (ASICs), and field-programmable gate arrays (FPGAs). One or more blocks may be implemented as a combination of dedicated hardware to perform some functions and one or more programmed microprocessors and associated circuitry to perform other functions.

Various examples of the present disclosure are enumerated below:

Example 1. A method for determining the relevance of log files to a fault of a medical imaging device, the medical imaging device comprising a plurality of subsystems, and each log file being associated with a respective subsystem of the medical imaging device, the method comprising:

obtaining (110) initial problem input data relating to the fault of the medical imaging device;

performing (120) a first natural language processing analysis on the initial problem input data to identify one or more features of the medical imaging device fault;

providing (130) one or more features of the medical imaging device fault to a machine learning algorithm, the machine learning algorithm being trained to predict, for each of the plurality of subsystems of the medical imaging device, a fault probability indicating a likelihood that the fault of the medical imaging device originated from the subsystem;

obtaining (140) a prediction result from machine learning algorithm, the prediction result comprising a fault probability for each of the plurality of subsystems of the medical imaging device; and determining (150), for content of each log file, a relevance score based on the obtained prediction result.

Example 2. The method of Example 1, wherein obtaining initial problem input data comprises:

receiving, via in input interface, initial problem input data provided by a respondent in response to a request for data.

Example 3. The method of Example 2, wherein the request for data comprises a fault analysis questionnaire.

Example 4. The method of any of Examples 1 to 3, wherein the machine learning algorithm is trained using a training algorithm configured to receive an array of training inputs and respective known outputs, wherein a training input comprises one or more features of a fault of a medical imaging device and respective known output comprises, for each of the plurality of subsystems of the medical imaging device, a fault probability indicating a likelihood that the fault of medical imaging device originated from the subsystem.

Example 5. The method of any of Examples 1 to 4, wherein the machine learning algorithm comprises a binary classifier trained to make a decision about the fault of the medical imaging device originating in a software subsystem or a hardware subsystem.

Example 6. The method of any of Examples 1 to 5, wherein the step of determining, for content of each log file, a relevance score comprises:

determining, for content of each log file, system relevance scores indicating a relevance of the log file content to each of the subsystems;

determining, for each subsystem, an error probability indicating a probability that the fault of the medical imaging device relates to the subsystem; and processing the system relevance scores and error probabilities to obtain, for content of each log file, a relevance score.

Example 7. The method of Example 6 wherein processing comprises:

processing the system relevance scores and error probabilities based on the following equation:

$$R(e, m, f) = R_{comp}(f) P_{comp}(e, m) + \sum_{i=1}^{n} R_{sub_i}(f) P_{sub_i}(e, m)$$

wherein: $R(e,m,f)$ is the relevance score of a log file f for the medical imaging device m with the fault e; $R_{comp}(f)$ indicates how relevant the log file f is for a component related fault; $R_{sub_i}(f)$ indicates how relevant the log file f is for a fault in a subsystem; $P_{comp}(e,m)$ is the probability of the fault e being component-related; and $P_{sub_i}(e,m)$ is the probability of the fault e being related to a subsystem.

Example 8. A method for diagnosing a fault of a medical imaging device, the method comprising:

determining (100) the relevance of a plurality of log files to a fault of a medical imaging device according to any of Examples 1 to 7; and generating (120) a prioritized list of the log files based on the determined relevance of the content of the plurality of log files.

Example 9. A method for determining severity of a fault of a medical imaging device comprising a plurality of subsystems, the method comprising:

obtaining (410) initial input data from a user relating to the fault of the medical imaging device;

performing (420) a first natural language processing analysis on the initial input data to determine a first severity score relating to a description of the fault;

analysing (430) the initial input data and the plurality of subsystems to determine a second severity score relating to the subsystems of the medical imaging device; and determining (440) an overall severity score indicating a severity of the fault based on the first severity score and the second severity score.

Example 10. The method of Example 9, further comprising:

determining a third severity score relating to a priority of a user of the medical imaging device, and wherein determining an overall severity score is further based on the third severity score.

Example 11. The method of Example 9 or 10, further comprising:

applying a weighting to the overall severity score based on at least one of: the first severity score; the second severity score; and a parameter value of a log file identified for the fault.

Example 12. A method for diagnosing a fault of a medical imaging device, the method comprising:

determining (400) a severity of the fault of a medical imaging device according to any of Example 9 to 11; and for a plurality of log files associated with respective subsystems of the medical imaging device, generating (510) a prioritized list of the plurality of log files based on the determined severity of the fault.

Example 13. A method for diagnosing a fault of a medical imaging device, the method comprising:

determining the relevance of log file content to a fault of a medical imaging device according to Example 1;

determining a severity of the fault of the medical imaging device according to Example 9; and generating a prioritized list of the log files based on the determined relevance of the plurality of log files and the determined severity of the fault of the medical imaging device, and preferably further based on a parameter value of each log file, such as log file size.

Example 14. A computer program comprising code means for implementing the method of any preceding Example when said program is run on a processing system.

Example 15. A system for determining the relevance of log files to a fault of a medical imaging device, the medical imaging device comprising a plurality of subsystems, and each log file being associated with a respective subsystem of the medical imaging device, the system comprising:

a data interface (910) configured to obtain initial problem input data relating to the fault of the medical imaging device;

a natural language processing component (920) configured to perform a first natural language processing analysis on the initial problem input data to identify one or more features of the medical imaging device fault; and a machine learning algorithm (930) configured to receive one or more features of the medical imaging device fault, the machine learning algorithm being trained to output a prediction result comprising a fault probability for each of the plurality of subsystems of the medical imaging device, a fault probability indicating a likelihood that the fault of the medical imaging device originated from the subsystem; and a processor (940) configured to determine, for each log file, a relevance score based on the obtained prediction result.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for diagnosing a fault of a medical imaging device, the method comprising:

determining a relevance of log files to the fault of the medical imaging device, the medical imaging device comprising a plurality of subsystems, and each log file being associated with a respective subsystem of the medical imaging device, the determining a relevance of log files to the fault of the medical imaging device comprising:

obtaining initial problem input data relating to the fault of the medical imaging device;

performing a first natural language processing analysis on the initial problem input data to identify one or more features of the medical imaging device fault;

providing one or more features of the medical imaging device fault to a machine learning algorithm, the machine learning algorithm being trained to predict, for each of the plurality of subsystems of the medical imaging device, a fault probability indicating a likelihood that the fault of the medical imaging device originated from the subsystem;

obtaining a prediction result from the machine learning algorithm, the prediction result comprising a fault probability for each of the plurality of subsystems of the medical imaging device; and determining, for content of each log file, a relevance score based on the obtained prediction result; and wherein the method for diagnosing the fault of the medical imaging device further comprises:

generating a prioritized list of the log files based on the determined relevance of the content of a plurality of log files.

2. The method of claim 1, wherein the method for diagnosing the fault of the medical imaging device further comprises:

transmitting the log files in the prioritized list over a data communication channel to a remote processing device, and in a priority order defined by the prioritized list, the remote processing device being configured for analysing the transmitted log files and for diagnosing the fault of the medical imaging device based on a result of the analysing.

3. The method of claim 1, wherein obtaining initial problem input data comprises:

receiving, via in input interface, initial problem input data provided by a respondent in response to a request for data.

4. The method of claim 3, wherein the request for data comprises a fault analysis questionnaire.

5. The method of claim 1, wherein the machine learning algorithm is trained using a training algorithm configured to receive an array of training inputs and respective known outputs, wherein a training input comprises one or more features of a fault of a medical imaging device and respective known output comprises, for each of the plurality of subsystems of the medical imaging device, a fault probability indicating a likelihood that the fault of medical imaging device originated from the subsystem.

6. The method of claim 1, wherein the machine learning algorithm comprises a binary classifier trained to make a decision about the fault of the medical imaging device originating in a software subsystem or a hardware subsystem.

7. The method of any of claim 1, wherein the step of determining, for content of each log file, a relevance score comprises:

determining, for content of each log file, system relevance scores indicating a relevance of the log file content to each of the subsystems;

determining, for each subsystem, an error probability indicating a probability that the fault of the medical imaging device relates to the subsystem; and processing the system relevance scores and error probabilities to obtain, for content of each log file, a relevance score.

8. The method of claim 7 wherein the processing comprises:

processing the system relevance scores and error probabilities based on the following equation:

$$R(e, m, f) = R_{comp}(f)P_{comp}(e, m) + \sum_{i=1}^{n} R_{sub_i}(f)P_{sub_i}(e, m)$$

wherein: $R(e,m,f)$ is the relevance score of a log file f for the medical imaging device m with the fault e; $R_{comp}(f)$ indicates how relevant the log file f is for a component related fault; $R_{sub_i}(f)$ indicates how relevant the log file f is for a fault in a subsystem; $P_{comp}(e,m)$ is the probability of the fault e being component-related; and $P_{sub_i}(e,m)$ is the probability of the fault e being related to a subsystem.

9. A method for determining severity of a fault of a medical imaging device comprising a plurality of subsystems, the method comprising:

obtaining initial input data from a user relating to the fault of the medical imaging device;

performing a first natural language processing analysis on the initial input data to determine a first severity score relating to a description of the fault;

analysing the initial input data and the plurality of subsystems to determine a second severity score relating to the subsystems of the medical imaging device; and determining an overall severity score indicating a severity of the fault based on the first severity score and the second severity score;

wherein the method further comprises for a plurality of log files associated with respective subsystems of the medical imaging device, generating a prioritized list of the plurality of log files based on the determined severity of the fault.

10. The method of claim 9, further comprising:

determining a third severity score relating to a priority of a user of the medical imaging device, and wherein determining an overall severity score is further based on the third severity score.

11. The method of claim 9, further comprising:

applying a weighting to the overall severity score based on at least one of: the first severity score; the second severity score; and a parameter value of a log file identified for the fault.

12. A method for diagnosing a fault of a medical imaging device, the method comprising:

determining the relevance of log file content to a fault of a medical imaging device according to claim 1;

determining a severity of the fault of the medical imaging device; and generating a prioritized list of the log files based on the determined relevance of the plurality of log files and the determined severity of the fault of the medical imaging device, and preferably further based on a parameter value of each log file, such as log file size.

13. A computer program comprising code configured to implement the method of claim 1 when executed on a processing system.

14. A system for determining a relevance of log files to a fault of a medical imaging device, the medical imaging device comprising a plurality of subsystems, and each log file being associated with a respective subsystem of the medical imaging device, the system comprising:

a data interface configured to obtain initial problem input data relating to the fault of the medical imaging device;

a natural language processing component configured to perform a first natural language processing analysis on the initial problem input data to identify one or more features of the medical imaging device fault; and a machine learning algorithm configured to receive one or more features of the medical imaging device fault, the machine learning algorithm being trained to output a prediction result comprising a fault probability for each of the plurality of subsystems of the medical imaging device, a fault probability indicating a likelihood that the fault of the medical imaging device originated from the subsystem; and a processor configured to determine, for each log file, a relevance score based on the obtained prediction result; and wherein the processor is further configured to:

generate a prioritized list of the log files based on the determined relevance of a plurality of log files; and transmit the log files in the prioritized list over a data communication channel to a remote processing device, and in a priority order defined by the prioritized list, the remote processing device being configured for analysing the transmitted log files and for diagnosing the fault of the medical imaging device based on a result of the analysing.

* * * * *